F. SARGENT.
PROCESS OF COUPLING PIPES.
APPLICATION FILED NOV. 3, 1910.
986,506.
Patented Mar. 14, 1911.
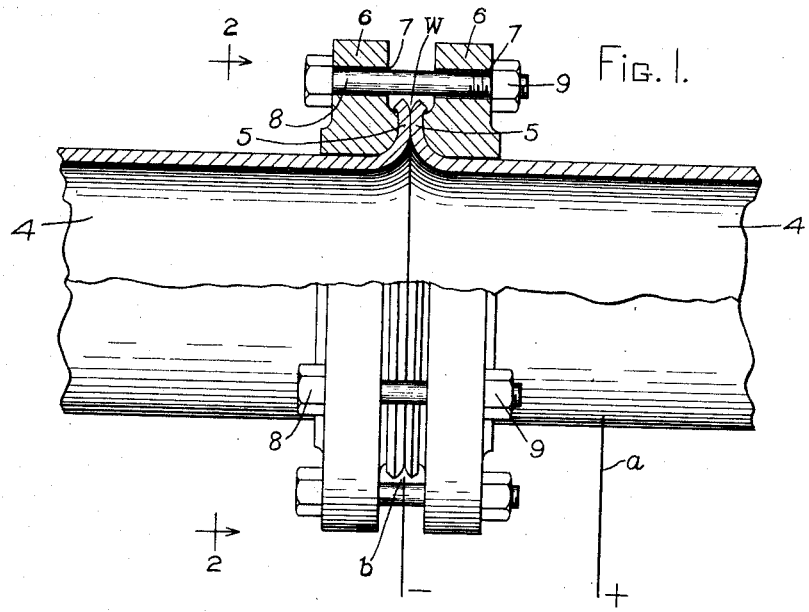
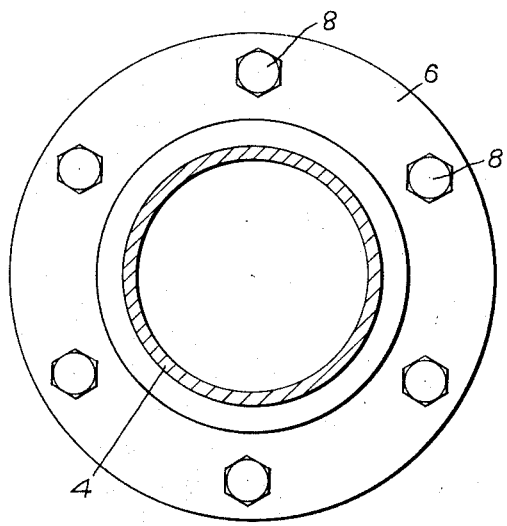
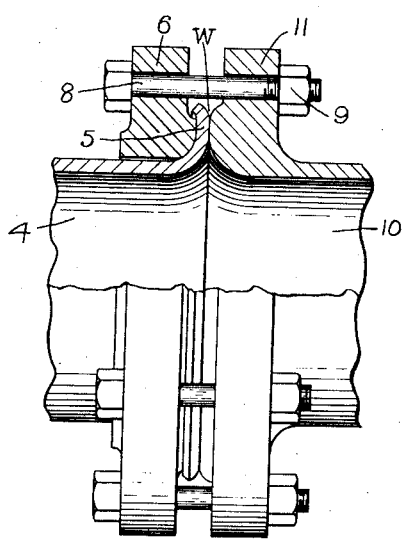
Witnesses
George F. Higham.
Leonard W. Novander.
Inventor
Frederick Sargent
By Browne Williams
Attorneys

UNITED STATES PATENT OFFICE.

FREDERICK SARGENT, OF CHICAGO, ILLINOIS, ASSIGNOR OF ONE-HALF TO OLAF E. OLESON, OF CHICAGO, ILLINOIS.

PROCESS OF COUPLING PIPES.

986,506.  Specification of Letters Patent.  Patented Mar. 14, 1911.

Original application filed December 18, 1909, Serial No. 533,933. Divided and this application filed November 3, 1910. Serial No. 590,508.

*To all whom it may concern:*

Be it known that I, FREDERICK SARGENT, a citizen of the United States, residing at Chicago, in the county of Cook and State of Illinois, have invented a certain new and useful Improvement in Processes of Coupling Pipes, (Case 2,) of which the following is a full, clear, concise, and exact description, reference being had to the accompanying drawings, forming a part of this specification.

My invention relates to processes of coupling pipes and its object is to provide for an absolutely tight and durable joint.

This application is divisional from my copending case, filed December 18, 1909, Serial No. 533,933, Patent No. 977,226, November 29, 1910, the latter application being now directed alone toward a pipe coupling as an article of manufacture.

In accordance with my invention the joint is sealed by welding the abutting ends of pipes to be joined together and is held secure by means of an auxiliary arrangement in the way of a mechanical clamp. The difficulty heretofore has been that a welded joint was not sufficiently reliable, so far as securing rigid mechanical connection of the joined pipes was concerned, and could not be used at all where it was probable that the pipes would be subjected to more or less frequent strains. So far as the continuity of the pipes or the tightness of the joint is concerned, it has been quite generally conceded that a welded joint cannot be excelled, and the only bar to its more frequent employment is the insecurity of the mechanical connection, as above pointed out.

My invention proposes the employment of mechanical means for the purposes of holding the ends of the pipe together and, in addition, the welding of the pipe ends to secure an absolutely sealed joint. In a pipe coupling constructed in accordance with my invention the necessity of gaskets, washers, or other similar packing devices is entirely eliminated, while all the advantageous features of such contrivances are retained. The replacement of parts, so frequent when gaskets are employed, never becomes necessary, while, in taking down a pipe system, no difficulty in separating the pipes is encountered.

The process of my invention will be better understood by reference to the accompanying drawings, in which—

Figure 1 is a side elevational view of two pipe ends joined in accordance with my invention; Fig. 2 is a cross-sectional view taken on the plane 2, 2 of Fig. 1; and Fig. 3 is a view similar to Fig. 1 showing a modified arrangement.

The abutting pipes are shown at 4, 4, and the ends thereof, as shown at 5, 5, are flanged outwardly to present a considerable engaging surface and, further, to provide means with which a mechanical clamp can coöperate. The mechanical clamp comprises, as illustrated, a pair of clamping rings 6, 6 which engage respectively on opposite sides of the joined flanges, as clearly shown in Fig. 1. The rings 6, 6 are provided with registering openings 7, 7 for the reception of bolts 8, 8, which are provided with clamping nuts 9, 9, so that the two rings can be drawn together to the desired extent.

In usual practice the pipes shown in Fig. 1 are made of soft steel and, when they are to be joined, are flanged at their abutting ends in any desirable manner. The clamping rings are then applied and the bolts tightened to secure bringing the flanged ends together. A hot flame is placed around the joined ends to form a weld at $w$, being applied specifically to the edges so that the welding area will be a somewhat limited one. A convenient way in which this may be done will be presently described. It is to be noted that the entire mechanical strain is taken up by the clamp, while the welding does no more than to form a hermetic seal.

In the matter of welding the pipe ends together an oxy-acetylene flame may be conveniently used. I contemplate also, however, the use of an electric arc flame, this method being conveniently carried out by attaching one terminal of a high-tension circuit to the pipe proper, as indicated at $a$, and drawing the arc from the edge $w$ with the other terminal of the circuit, as indicated at $b$. This will secure the weld and is a particular advantageous method, since the flame can well be confined to just those parts which it is desired to affect.

In Fig. 3 one of the pipe members is shown as a casting 10, which has one of the clamping members formed integrally thereon. The pipe 4 is of soft steel like the pipes shown in Fig. 1, and the clamping member 6 is applied precisely as described above. The bolt 8 passes through the clamping member 6 and directly through the member 11 on the casting 10, and it is clear that tightening of the bolts will draw the flanged end 5 of the pipe 4 against the face of the casting 10, as clearly illustrated in the drawing. The flame is now placed around the abutting ends to form a weld at $w$, precisely as described above. It is contemplated that this modified form will be employed where one of the members is an elbow, coupling device or other similar device.

When it is desired to separate the pipes the mechanical clamp may be removed and a cold-chisel placed in the V-shaped annular groove and given a sharp blow.

The method of my invention may be employed to secure a very efficient pipe joint in a very simple manner. The mechanical clamp, being first applied, brings the abutting ends in proper juxtaposition for the purposes of welding and the further steps in the process may be carried out very conveniently. The weld which results is such that the pipes can easily be separated when desired and the specific manner of welding, which I mention and which I consider very important, is very effective in securing this desirable form of weld and in securing it in a very convenient manner.

I claim as new and desire to secure by Letters Patent:

1. The process of coupling pipes which consists in permanently mechanically clamping the abutting ends of the pipes together, and then welding the ends of the pipes together to seal the joint.

2. The process of coupling pipes which consists in flanging the abutting ends thereof, then permanently mechanically clamping said ends together, and then welding the edges of said ends together to seal the joint.

3. The process of coupling pipes which consists in flanging the abutting ends thereof, then permanently mechanically connecting said ends together, and then concentrating heat upon the edges of said ends to weld the edges to seal the joint.

4. The process of coupling pipes which consists in permanently mechanically clamping the abutting ends of the pipes together, and then welding the ends of the pipes together to seal the joint.

5. The process of coupling pipes which consists in permanently mechanically clamping the abutting ends of the pipes together, attaching one pole of an electric circuit to said pipes, and then drawing an arc between the other pole of said circuit and the ends of said pipes to form a weld to seal the joint.

6. The process of coupling pipes which consists in flanging the abutting ends thereof, then permanently mechanically clamping said ends together, then attaching one pole of an electric circuit to said pipes, and then drawing an arc between the other pole of the electric circuit and the edges of said ends to form a weld to seal the joint.

In witness whereof, I hereunto subscribe my name this 31st day of October, A. D. 1910.

FREDERICK SARGENT.

Witnesses:
ARTHUR H. BOETTCHER,
ALBERT G. McCALEB.